(12) United States Patent
Katsumata et al.

(10) Patent No.: US 8,794,069 B2
(45) Date of Patent: Aug. 5, 2014

(54) ANGULAR VELOCITY SENSOR

(75) Inventors: Takashi Katsumata, Kariya (JP); Hirofumi Higuchi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 13/531,680

(22) Filed: Jun. 25, 2012

(65) Prior Publication Data

US 2013/0000404 A1    Jan. 3, 2013

(30) Foreign Application Priority Data

Jun. 28, 2011    (JP) ................................. 2011-143169

(51) Int. Cl.
  *G01C 19/56*    (2012.01)
(52) U.S. Cl.
  USPC .................................... 73/504.12; 73/504.04
(58) Field of Classification Search
  USPC ................ 73/504.02, 504.04, 504.12, 504.14
  See application file for complete search history.

(56) References Cited

U.S. PATENT DOCUMENTS

| | | | |
|---|---|---|---|
| 5,987,986 A | 11/1999 | Wyse | |
| 6,349,597 B1 * | 2/2002 | Folkmer et al. | 73/504.02 |
| 6,520,017 B1 * | 2/2003 | Schoefthaler et al. | 73/514.02 |
| 8,393,211 B2 * | 3/2013 | Kandori et al. | 73/504.12 |
| 2002/0020219 A1 | 2/2002 | DeRoo | |
| 2002/0189351 A1 | 12/2002 | Reeds | |
| 2003/0131664 A1 | 7/2003 | Mochida et al. | |
| 2004/0041643 A1 | 3/2004 | Giousouf | |
| 2007/0199377 A1 | 8/2007 | Katsumata et al. | |
| 2010/0126269 A1 | 5/2010 | Coronato et al. | |

FOREIGN PATENT DOCUMENTS

| | | |
|---|---|---|
| JP | 07-294262 A | 11/1995 |
| JP | 11-142164 A | 5/1999 |
| JP | A-2001-116552 | 4/2001 |
| JP | 2001-183138 A | 7/2001 |
| JP | A-2006-64539 | 3/2006 |
| JP | 2010-096538 A | 4/2010 |

* cited by examiner

*Primary Examiner* — Helen Kwok
(74) *Attorney, Agent, or Firm* — Posz Law Group, PLC

(57) ABSTRACT

An angular velocity sensor includes a vibrator, a support substrate, an anchor section, a connection beam section, a driving section, and a detection section. The vibrator includes an inner vibrator and an outer vibrator, which vibrate in opposite circumferential directions when driven by the driving section. The connection beam section couples the vibrator to the anchor section, and is elastic in a z-direction and a circumferential direction. The connection beam section includes first connection beams, each of which is coupled to the outer vibrator at one end and is coupled to the inner vibrator at the other end, and second connection beams, each of which is coupled to a vibration node of a corresponding first connection beam at one end and is coupled to the anchor section at the other end.

16 Claims, 10 Drawing Sheets

ANGULAR VELOCITY SENSOR

CROSS REFERENCE TO RELATED APPLICATION

This application is based on Japanese Patent Application No 2011-143169 filed on Jun. 28, 2011, the disclosure of which is incorporated herein by reference.

TECHNICAL FIELD

The present disclosure relates to an angular velocity sensor including a vibrator arranged apart from a support substrate at a height and a plurality of anchors arranged at the same heights with the vibrator from the substrate and coupled to the vibrator via connection beams.

BACKGROUND

As disclosed in JP-A-2010-151808 (corresponding to US 2010/0126269), an integrated microelectronicmechanical structure is well known. In this structure, a driving mass is fixed to a substrate via an elastic anchor. The driving mass is actuated by a driving movement around a vertical axis, thereby performing a rotary movement on a plane perpendicular to the vertical axis. When an angular velocity is applied to the moving driving mass, the angular velocity generates a Coriolis force on the driving mass. In the microelectronicmechanical structure disclosed in JP-A-2010-151808, the angular velocity is detected by detecting a displacement of the driving mass caused by the Coriolis force.

As shown in FIG. 4 of JP-A-2010-151808, the driving mass has an annular shape. In the microelectronicmechanical structure, a first anchor is arranged in a first region, which is surrounded by an inner surface of the annular driving mass. Further, four second anchors are arranged in a second region, which is defined as an outside region of an outer surface of the annular driving mass. Further four first elastic anchors are arranged in such a manner that the first anchor is coupled to one end of each first elastic anchor and the other end of each first elastic anchor is coupled to the inner surface of the annular driving mass. Further, four second elastic anchors are arranged in such a manner that one end of each second elastic anchor is coupled to the outer surface of the annular driving mass and the other end of each second elastic anchor is coupled to a corresponding second anchor. With this arrangement, the driving mass is supported by the anchors via eight elastic anchors.

As described above, in the microelectronicmechanical structure disclosed in JP-A-2010-151808, one end of each elastic anchor is coupled to the driving mass and the other end of each elastic anchor is coupled to a corresponding anchor that is fixed to the substrate. In this structure, the vibration generated by the driving mass is transmitted to the anchors via the elastic anchors. Then, the vibration transmitted to the anchors reflects on the substrate and the reflected vibration is transmitted back to the driving mass via the elastic anchors. Thus, a movement state of the driving mass becomes unstable, thereby decreasing a sensitivity of angular velocity detection.

SUMMARY

In view of the foregoing difficulties, it is an object of the present disclosure to provide an angular velocity sensor in which a decrease in a sensitivity of angular velocity detection is suppressed.

According to an aspect of the present disclosure, an angular velocity sensor includes a vibrator, a support substrate, an anchor section, a connection beam section, a driving section, and a detection section. The vibrator is arranged on a x-y plane defined by an x-direction and a y-direction perpendicular to each other. The vibrator includes an outer vibrator having an annular plane shape on the x-y plane and an inner vibrator having an annular plane shape on the x-y plane. The inner vibrator is arranged in a region surrounded by an inner surface of the outer vibrator. The support substrate is arranged apart from the vibrator in a z-direction perpendicular to the x-y plane. The anchor section extends from the support substrate to the x-y plane on which the vibrator is arranged. The connection beam section couples the vibrator to the anchor section, and has an elasticity in the z-direction and an elasticity in an circumferential direction around the z-direction. The driving section vibrates the vibrator in the circumferential direction. The detection section detects a displacement of the vibrator in the z-direction. The connection beam section includes a plurality of first connection beams and a plurality of second connection beams. Each of the first connection beams is coupled to the inner surface of the outer vibrator at one end and is coupled to an outer surface of the inner vibrator at the other end. Each of the second connection beams is coupled to a corresponding one of the first connection beams at one end and is coupled to the anchor section at the other end. The driving section vibrates the inner vibrator and the outer vibrator in opposite circumferential directions to perform a coupled vibration. The one end of each of the second connection beams is coupled to a vibration node of the corresponding one of the first connection beams. The vibration node is a point that has no vibration during the coupled vibration performed by the inner vibrator and the outer vibrator.

In the above device, the coupled vibration performed by the inner vibrator and the outer vibrator is less likely to be transmitted to the support substrate via the connection beam section. Thus, the vibration is less likely to be transmitted back to the inner vibrator and the outer vibrator after reflecting on the support substrate. Thus, a vibration state of the vibrator is less likely to become unstable, thereby suppressing a decrease in a sensitivity of angular velocity detection.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

An angular velocity sensor 100 according to a first embodiment will be described with reference to FIG. 1 to FIG. 10. Further, hereinafter, a direction along an x-axis is defined as an x-direction, a direction along a y-axis perpendicular to the x-axis is defined as a y-direction, a plane defined by the x-axis and the y-axis is defined as an x-y plane, and a direction along a z-axis perpendicular to the x-y plane is defined as a z-direction.

Figure 1:
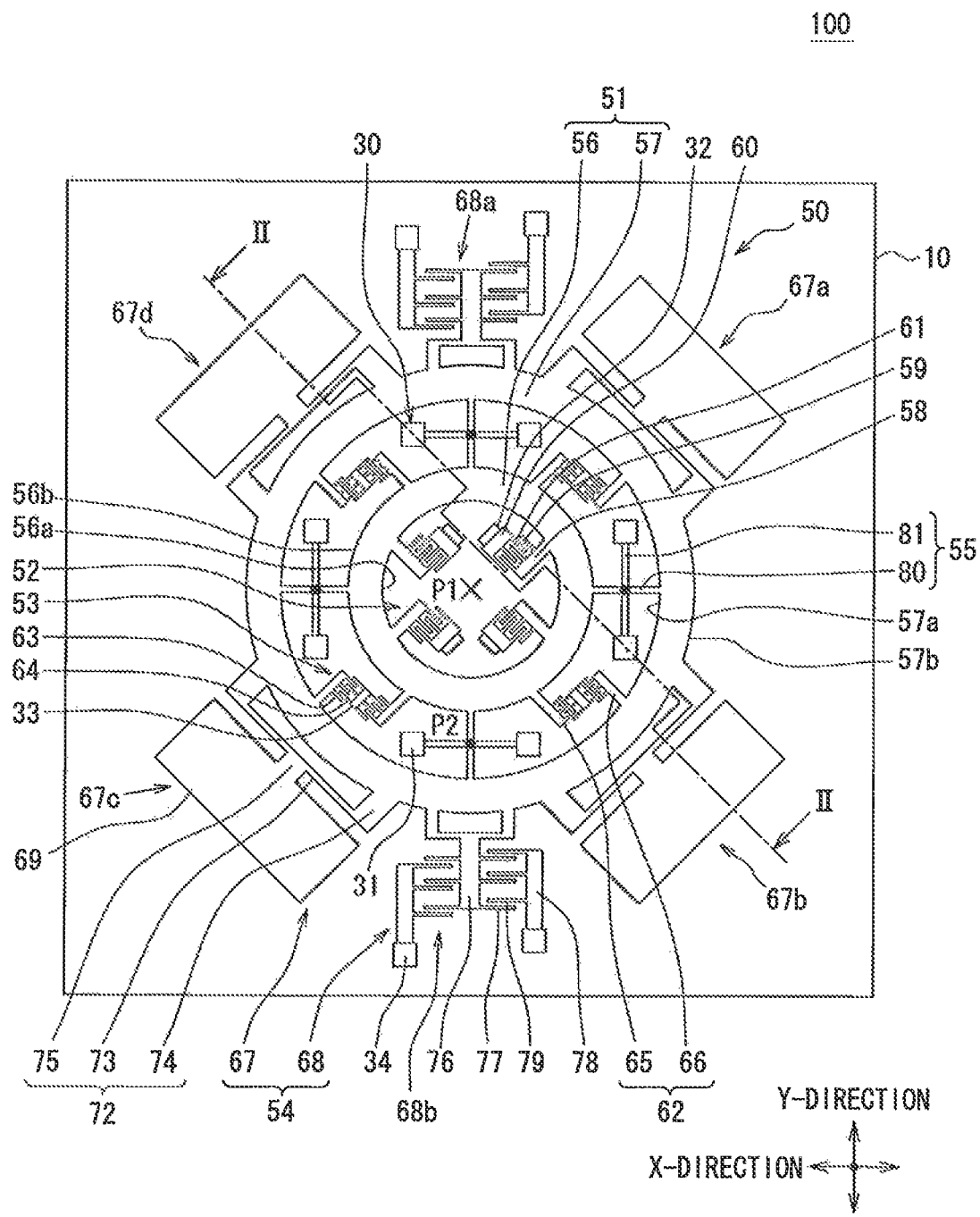
FIG. 1 is a diagram showing a top view of an angular velocity sensor according to a first embodiment of the present disclosure.
Figure 2:
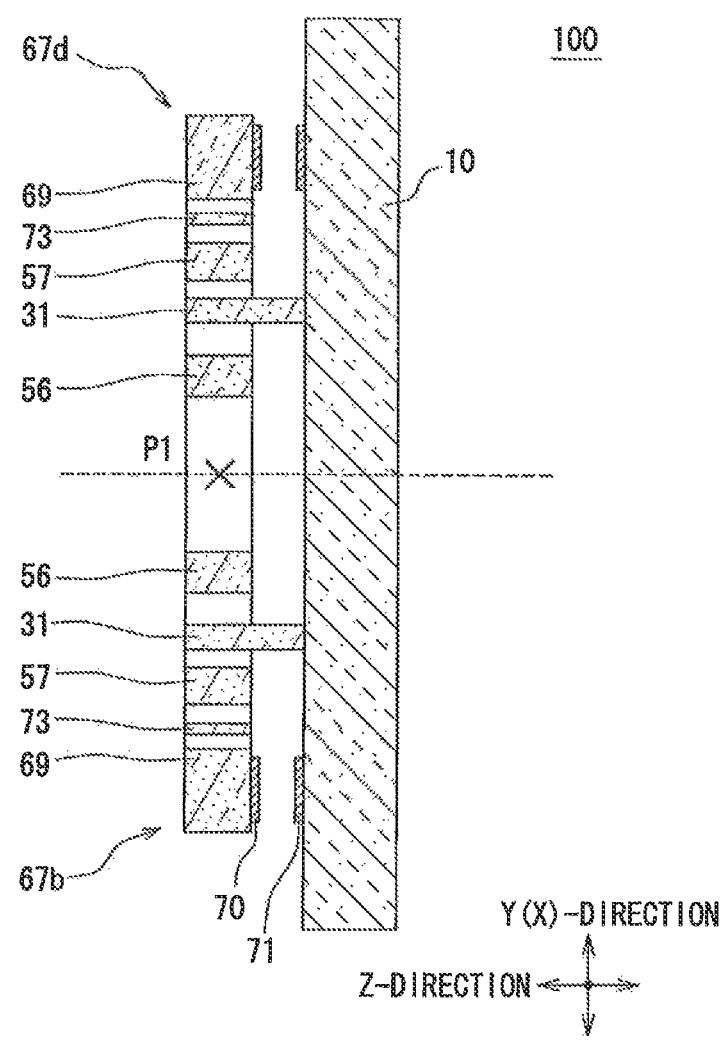
FIG. 2 is a cross-sectional view of the angular velocity sensor taken along line II-II in FIG. 1.

As shown in FIG. 1 and FIG. 2, the angular velocity sensor 100 mainly includes a support substrate 10, an anchor section, and a floating section 50. The floating section 50 is arranged apart from the support substrate 10 at a distance in the z-direction. The floating section 50 is coupled to the support substrate 10 via the anchor section 30. The floating section 50 includes a vibrator 51, a plurality of monitors 52, a plurality of drivers 53, a plurality of detectors 54, and a plurality of connection beams 55. The anchor section 30 includes a plurality of first anchors 31, a plurality of second anchors 32, a plurality of third anchors 33, and a plurality of fourth anchors 34. The anchor section 30 couples the floating section 50 to the support substrate 10. Each anchor 31 to 34 includes an electrode, which is not shown. The vibrator 51 is fixed to the first anchors 31 via the connection beams 55, and is movable with respect to the support substrate 10. When an angular velocity is applied to the moving vibrator 51, a Coriolis force is generated in a direction perpendicular to a moving direction of the vibrator 51 and a direction of the applied angular velocity. The Coriolis force causes a displacement of the vibrator 51. Thus, the angular velocity can be detected by detecting the displacement of the vibrator 51.

The vibrator 51 includes an inner vibrator 56 and an outer vibrator 57, each of which has an annular planar shape on the x-y plane. The inner vibrator 56 is arranged in a region surrounded by an inner surface 57a of the outer vibrator 57. The inner vibrator 56 and the outer vibrator 57 are coupled via the connection beams 55. The connection beams 55 are fixed to the support substrate 10 via the first anchors 31. The annular inner vibrator 56 and the annular outer vibrator 57 are arranged concentrically at a center point P1 (shown by "X" in FIG. 1). Thus, a perpendicular distance between the inner vibrator 56 and the outer vibrator 57 is constant. The inner vibrator 56 and the outer vibrator 57 vibrate in two opposite circumferential directions around a center line (shown by a dashed line in FIG. 2), which penetrates the center point P1 in the z-direction. The vibration of the inner and outer vibrators 56, 57, which is also known as a coupled vibration, will be more specifically described later. A direct current (DC) voltage is input to electrodes of the first anchors 31, and the DC voltage is further input to the vibrator 51 via the connection beams 55.

Each monitor 52 includes a flexible monitor beam 58, a flexible monitor electrode 59, a fixed monitor beam 60, and a fixed monitor electrode 61. The flexible monitor beam 58 extends from the inner vibrator 56, and the flexible monitor electrode 59 extends from the flexible monitor beam 58 in a circumferential direction. The fixed monitor beam 60 is fixed to a corresponding second anchor 32, and the fixed monitor electrode 61 extends from the fixed monitor beam 60 in the circumferential direction. More specifically, in the angular velocity sensor 100 according to the present embodiment, each flexible monitor beam 58 extends from an inner surface 56a of the inner vibrator 56 toward the center point P1, and each flexible monitor electrode 59 having a comb-shape extends from a side surface of a corresponding flexible monitor beam 58. In each flexible monitor beam 58, the side surface, from which a corresponding flexible monitor electrode 59 extends, is perpendicular to the circumferential direction. The fixed monitor beams 60 and the second anchors 32 are arranged in a region surrounded by the inner surface 56a of the inner vibrator 56. Each fixed monitor electrode 61 having a comb-shape extends from a side surface of a corresponding fixed monitor beam 60. In each fixed monitor beam 60, the side surface, from which a corresponding fixed monitor electrode 61 extends, faces the corresponding flexible monitor beam 58. Thus, the flexible monitor electrode 59 and the fixed monitor electrode 61 are engaged with each other and face each other in a direction perpendicular to the circumferential direction. The circumferential direction is perpendicular to a radial direction having the center point P1 as a radial center. Hereinafter, the flexible monitor electrode 59 and the fixed monitor electrode 61 are also referred to as a monitor electrode, and the flexible monitor beam 58 and the fixed monitor beam 60 are also referred to as a monitor beam. The monitor electrodes 59, 61 are arranged in an arc-shape around the center point P1. Each monitor electrode 59, 61 is arranged to be apart from one another so that each monitor electrode 59, 61 does not collide with one another during a vibration of the vibrator 51 in the circumferential direction.

As described above, each flexible monitor beam 58 extends from the inner vibrator 56. Accordingly, the DC voltage is input to the flexible monitor electrodes 59 via the flexible monitor beams 58. Thus, an electric potential of the fixed monitor electrodes 61, each of which faces to a corresponding flexible monitor electrode 59, varies depending on the DC voltage. Further, each fixed monitor electrode 61 extends from a corresponding fixed monitor beam 60, and the fixed monitor beam 60 is fixed to a corresponding second anchor 32. Thus, a signal depending on the DC voltage is expected to be output from electrodes of the second anchors 32.

As shown in FIG. 1, the angular velocity sensor 100 according to the present embodiment includes four monitors 52 and four second anchors 32 around the center point P1. Thus, the angular velocity sensor 100 according to the present embodiment includes four flexible monitor beams 58 extending from the inner vibrator 56, four fixed monitor beams 60 respectively fixed to the four second anchors 32. Accordingly, the angular velocity sensor 100 includes four flexible monitor electrodes 59 and four fixed monitor electrodes 61. The four monitors 52 are arranged in such a manner that each flexible monitor electrode 59 and a corresponding fixed monitor electrode 61 are engaged with each other and arranged at even intervals in the circumferential direction. With this configuration, each two monitors 52 are arranged facing each other. Further, each two adjacent monitors 52 are arranged in a symmetrical manner. In other words, two flexible monitor electrodes 59 extend from the corresponding flexible monitor beams 58 in a clockwise direction, and the other two flexible monitor electrodes 59 extend from the corresponding flexible monitor beams 58 in a counterclockwise direction. Similarly, two fixed monitor electrodes 61 extend from the corresponding fixed monitor beams 60 in the clockwise direction, and the other two fixed monitor electrodes 61 extend from the corresponding fixed monitor beams 60 in the counterclockwise direction. Alternatively, the four flexible monitor beams 58 may be arranged at even intervals in the circumferential direction, and the four fixed monitor beams 60 may be arranged at even intervals in the circumferential direction (not shown).

Each driver 53 includes a flexible driving beam 62, a flexible driving electrode 63, and a fixed driving electrode 64. Further, each flexible driving beam 62 includes a first flexible driving sub-beam 65 and a second flexible driving sub-beam 66. Each flexible driving electrode 63 includes a first flexible driving sub-electrode and a second flexible driving sub-electrode. Each fixed driving electrode 64 includes a first fixed driving sub-electrode and a second fixed driving sub-electrode. Each first flexible driving sub-beam 65 extends from an outer surface 56b of the inner vibrator 56 toward the outer vibrator 57, and each second flexible driving sub-beam 66 extends from the inner surface 57a of the outer vibrator 57 toward the inner vibrator 56. Each flexible driving electrode 63 extends from a corresponding flexible driving beam 62 in the circumferential direction. Specifically, each first flexible driving sub-electrode having a comb-shape extends from a side surface of a corresponding first flexible driving sub-beam 65 facing a third anchor 33, and each second flexible driving sub-electrode having a comb-shape extends from a side surface of a corresponding second flexible driving sub-beam 66 facing the third anchor 33. Each first fixed driving sub-electrode having a comb-shape extends from a side surface of a corresponding third anchor 33 in the circumferential direction facing a corresponding first flexible driving sub-beam 65, and each second fixed driving sub-electrode having a comb-shape extends from another side surface of the corresponding third anchor 33 in the circumferential direction facing a corresponding second flexible driving sub-beam 66. Each third anchor 33 and corresponding first and second fixed driving sub-electrodes are arranged between a corresponding first flexible driving sub-beam 65 and a corresponding second flexible driving sub-beam 66. Thus, each first flexible driving sub-electrode and a corresponding first fixed driving sub-electrode are engaged with each other and face each other in the radial direction. Similarly, each second flexible driving sub-electrode and a corresponding second fixed driving sub-electrode are engaged with each other and face each other in the radial direction. The flexible driving electrodes 63 and the fixed driving electrodes 64 are arranged in an arc shape around the center point P1. Each sub-electrode of the flexible driving electrodes 63 and the fixed driving electrodes 64 is arranged to be apart from one another so that each driving sub-electrode does not collide with one another during a vibration of the vibrator 51 in the circumferential direction.

The angular velocity sensor 100 according to the present embodiment includes four drivers 53 and four third anchors 33. Thus, the angular velocity sensor 100 includes four flexible driving beams 62, four flexible driving electrodes 63, and four fixed driving electrodes 64. The four drivers 53 are arranged at even intervals in the circumferential direction so that each first flexible driving sub-beam 65 and a corresponding second flexible driving sub-beam 66 are arranged at even intervals in the circumferential direction. With this configuration, each two drivers 53 are arranged facing each other across the inner vibrator 56. That is, each two first flexible driving sub-beams 65 are arranged facing each other across the inner vibrator 56, and each two second flexible driving sub-beams 66 are arranged facing each other across the inner vibrator 56. Alternatively, the four first flexible driving sub-beams 65 may be arranged at even intervals in the circumferential direction, and the four second flexible driving sub-beams 66 may be arranged at even intervals in the circumferential direction (not shown). Further, the four third anchors 33 are arranged in such a manner that the four third anchors 33 are arranged at even intervals in the circumferential direction so that each two third anchors 33 are arranged facing each other across the inner vibrator 56.

As described above, the inner vibrator 56 and the outer vibrator 57 vibrate in opposite circumferential directions driven by an electrostatic force generated between each flexible driving electrode and a corresponding fixed driving electrode 64. Since the generated electrostatic force is an attractive force, the electrostatic force is applied to the inner vibrator 56 in a direction from each first flexible driving sub-beam 65 to a corresponding third anchor 33. Thus, the inner vibrator 56 is displaced in the direction from the first flexible driving sub-beam 65 to the corresponding third anchor 33, which is the same with an extension direction of each first flexible driving sub-electrode from a corresponding first flexible driving sub-beam 65. Similarly, the electrostatic force is applied to the outer vibrator 57 in a direction from each second flexible driving sub-beam 66 to the corresponding third anchor 33. Thus, the outer vibrator 57 is displaced in the direction from the second flexible driving sub-beam 66 to the corresponding third anchor 33, which is the same with an extension direction of each second flexible driving sub-electrode from a corresponding second flexible driving sub-beam 66.

As shown in FIG. 1, when a 12 o'clock direction from the center point P1 is defined as a 0 degree direction, two drivers 53, which configure a pair, are arranged at 45 degree direction and 225 degree direction, respectively. In the two drivers 53, each first flexible driving sub-electrode extends from the first flexible driving sub-beam 65 in the clockwise direction, and each second flexible driving sub-electrode extends from the second flexible driving sub-beam 66 in the counterclockwise direction. Further, another two drivers 53, which configure another pair, are arranged at 135 degree direction and 315 degree direction, respectively. In the two drivers 53 of another pair, each first flexible driving sub-electrode extends from the first flexible driving sub-beam 65 in the counterclockwise direction, and each second flexible driving sub-electrode extends from the second flexible driving sub-beam 66 in the clockwise direction.

Under above-described configuration, when an electric potential lower than an electric potential of the flexible driving electrodes 63 is applied to the third anchors 33 respectively arranged at 45 degree direction and 225 degree direction through anchor electrodes (not shown), electrostatic forces are generated. Specifically, an electrostatic force is generated between each first flexible driving sub-beam 65 and the corresponding third anchor 33 in the clockwise direction, and an electrostatic force is generated between each second flexible driving sub-beam 66 and the corresponding third anchor 33 in the counterclockwise direction. The electric potential of the flexible driving electrodes 63 is equal to an electric potential of the vibrator 51. Thus, the DC voltage, which is input to the vibrator 51, is input to the flexible driving electrodes 63. When the electrostatic forces are generated, the inner vibrator 56 is displaced in the clockwise direction, and the outer vibrator 57 is displaced in the counterclockwise direction. Further, when the electric potential lower than the DC voltage is applied to the third anchors 33 respectively arranged at 135 degree direction and 315 degree direction through anchor electrodes (not shown), electrostatic forces are generated. Specifically, an electrostatic force is generated between each first flexible driving sub-beam 65 and the corresponding third anchor 33 in the clockwise direction, and an electrostatic force is generated between each second flexible driving sub-beam 66 and the corresponding third anchor 33 in the counterclockwise direction. When the electrostatic forces are generated, the inner vibrator 56 is displaced in the counterclockwise direction, and the outer vibrator 57 is displaced in the clockwise direction.

In each of the two drivers 53 respectively arranged at 45 degree direction and 225 degree direction, when the electric potential applied to the corresponding third anchors 33 is reversed, a displacement direction of the inner vibrator 56 and a displacement direction of the outer vibrator 57 are respectively reversed. Similarly, in each of the two drivers 53 respectively arranged at 135 degree direction and 315 degree direction, when the electric potential applied to the corresponding third anchors 33 is reversed, a displacement direction of the inner vibrator 56 and a displacement direction of the outer vibrator 57 are respectively reversed. In the angular velocity sensor 100 according to the present embodiment, a driving voltage Vd, which has a polarity changing at predetermined time intervals, is applied to each third anchor 33. Further, the driving voltage Vd is applied in such a manner that the voltage Vd applied to the two third anchors 33, which are respectively arranged at 45 degree direction and 225 degree direction, has a reversed phase compared with the voltage Vd applied to the two third anchors 33, which are respectively arranged at 135 degree direction and 315 degree direction. Under this configuration, the inner vibrator 56 and the outer vibrator 57 vibrate in opposite circumferential directions, thereby performing the coupled vibration.

The detectors 54 include first detectors 67 and second detectors 68. The first detectors 67 detect a displacement of the vibrator 51 in the z-direction. The second detectors 68 detect a displacement of the vibrator 51 in a direction perpendicular to the z-direction. As shown in FIG. 1 and FIG. 2, each first detector 67 includes a flexible member 69, a first flexible detection electrode 70, a first fixed detection electrode 71, and a connection member 72. Each first flexible detection electrode 70 is attached to a corresponding flexible member 69 facing the support substrate 10, and each first fixed detection electrode 71 is attached on the support substrate 10 facing the corresponding flexible member 69 in the z-direction. Each connection member 72 couples the corresponding flexible member 69 to the outer vibrator 57. Each first flexible detection electrode 70 and a corresponding first fixed detection electrode 71 face each other in the z-direction, and a change in an electrostatic capacity between the first flexible detection electrode 70 and the first fixed detection electrode 71 is detected.

Each connection member 72 includes a tangent sub-member 73, two first extension sub-members 74, and a second extension sub-member 75. Each tangent sub-member 73 extends in a tangential direction. Two first extension sub-members 74 respectively extend from two ends of a corresponding tangent sub-member 73 to the outer vibrator 57. Each second extension sub-member 75 extends from a center point of the corresponding tangent sub-member 73 to the flexible member 69. With this configuration, each tangent sub-member 73 is more likely to bend in the radial direction and is more likely to be distorted in the z-direction, but is less likely to bend in the circumferential direction. Thus, an electrostatic capacity between the first flexible detection electrode 70 and the corresponding first fixed detection electrode 71 changes more easily according to a displacement of the vibrator 51 in the z-direction.

In the angular velocity sensor 100 according to the present embodiment, the connection members 72 are configured to have a higher elastic modulus than the connection beams 55 in the z-direction. Thus, the connection members 72 are less likely to be distorted in the z-direction. That is, the connection beams 55 have a lower elastic modulus than the connection members 72 in the z-direction. Thus, the connection beams 55 are more likely to be distorted in the z-direction. As described above, the inner and outer vibrators 56, 57 are coupled to the support substrate 10 via the connection beams 55 and the first anchors 31, and the first flexible detection electrodes 70 are coupled to the outer vibrator 57 via the connection members 72. Accordingly, the first flexible detection electrodes 70 are coupled to the anchor section 30 via the connection beams 55. Since the connection beams 55 are more likely to be distorted in the z-direction compared with the connection members 72, the first flexible detection electrodes 70 are displaced in the z-direction mainly depending on torsions of the connection beams 55 in the z-direction.

As shown in FIG. 1, the angular velocity sensor 100 according to the present embodiment includes four first detectors 67a, 67b, 67c, 67d arranged at even intervals in the circumferential direction. The four first detectors 67a to 67d extend from the outer vibrator 57 in the radial direction. A pair of the first detectors 67a, 67c is arranged facing each other, and the other pair of the first detectors 67b, 67d is arranged facing each other. When the vibrator 51 vibrates in the circumferential direction, two tangential points facing each other on the vibrator 51 move in opposite tangential directions. Thus, the first detectors 67a, 67c facing each other move in opposite tangential directions. Similarly, the first detectors 67b, 67d facing each other move in opposite tangential directions.

Each second detector 68 includes a flexible detection beam 76, a second flexible detection electrode 77, a fixed detection beam 78, and a second fixed detection electrode 79. The flexible detection beams 76 extend from an outer surface 57b of the outer vibrator 57 in the radial direction. Each second flexible detection electrode 77 extends from a corresponding flexible detection beam 76 in the circumferential direction. Each fixed detection beam 78 is fixed to a corresponding fourth anchor 34. Each second fixed detection electrode 79 extends from a corresponding fixed detection beam 78 in the circumferential direction. Each second flexible detection electrode 77 having a comb-shape extends from a side surface of the corresponding flexible detection beam 76. In each flexible detection beam 76, the side surface, from which a corresponding second flexible detection electrode 77 extends, is perpendicular to the circumferential direction. Each fixed detection beam 78 extends from a corresponding fourth anchor 34 toward the vibrator 51 in such a manner that each fixed detection beam 78 faces a corresponding flexible detection beam 76. Each second fixed detection electrode 79 extends from a corresponding fixed detection beam 78 in such a manner that each second fixed detection electrode 79 having a comb-shape extends from a side surface of the corresponding fixed detection beam 78 toward the corresponding flexible detection beam 76. In each fixed detection beam 78, the side surface, from which a corresponding second fixed detection electrode 79 extends, faces a corresponding flexible detection beam 76. With this configuration, each second flexible detection electrode 77 and a corresponding second fixed detection electrode 79 are engaged with each other and face each other in the radial direction. The second flexible detection electrodes 77 and the second fixed detection electrodes 79 are arranged in an arc-shape around the center point P1. Each of the second flexible detection electrodes 77 and the second fixed detection electrodes 79 is arranged to be apart from one another so that each detection electrode 77, 79 does not collide with one another during a vibration of the inner and outer vibrators 56, 57 in the circumferential direction. During the vibration, a change in an electrostatic capacity between each second flexible detection electrode 77 and the corresponding second fixed detection electrode 79 is detected by an electrode (not shown) of the corresponding fourth anchor 34.

As shown in FIG. 1, the angular velocity sensor 100 according to the present embodiment includes two second detectors 68a, 68b, which are arranged facing each other. The two second detectors 68a, 68b are coupled to the outer vibrator 57, and face each other across the vibrator 51. Thus, in the two second detectors 68a, 68b, two tangential points respectively placed on the two second detectors 68a, 68b move in opposite tangential directions.

Each connection beam 55 includes a first connection beam 80 and two second connection beams 81. Each first connection beam 80 is coupled to the inner surface 57a of the outer vibrator 57 at one end, and is coupled to the outer surface 56b of the inner vibrator 56 at the other end. Each second connection beam 81 is coupled to a corresponding first connection beam 80 at one end and is coupled to a corresponding first anchor 31 at the other end. With this configuration, each connection beam 55 has an elasticity in the z-direction and an elasticity in the circumferential direction. In the angular velocity sensor 100 according to the present embodiment, each first connection beam 80 is coupled with two second connection beams 81 in such a manner that each connection beam 55 has a cross-shaped top view. The connection beams 55 will be described in detail later.

Figure 3:
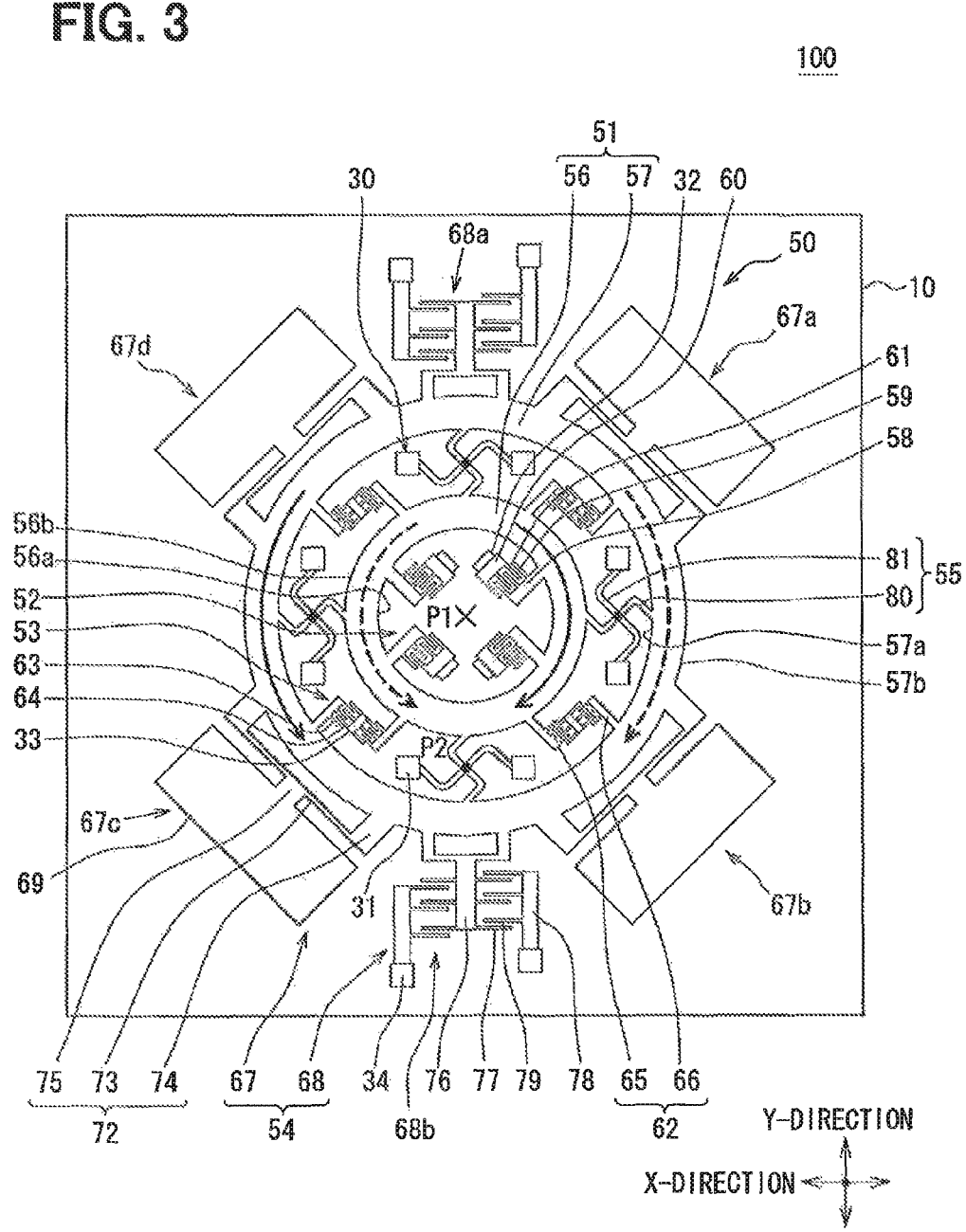
FIG. 3 is a diagram showing a movement state of the angular velocity sensor.

The following will describe an operation of the angular velocity sensor 100 and a principle of angular velocity detection. As described above, the DC voltage is applied to the first anchors 31, the driving voltage Vd is applied to the two third anchors 33 respectively arranged at 45 degree direction and 225 degree direction, and the reversed driving voltage Vd is applied to the two third anchors 33 respectively arranged at 135 degree direction and 315 degree direction. With this configuration, the inner vibrator 56 and the outer vibrator 57 vibrate in opposite circumferential directions driven by electrostatic forces generated by the applied voltages. The inner vibrator 56 and the outer vibrator 57 perform the coupled vibration. More specifically, as shown in FIG. 3 by bold lines, when the inner vibrator 56 moves in the clockwise direction, the outer vibrator 57 moves in the counterclockwise direction. Further, as shown in FIG. 3 by dashed lines, when the inner vibrator 56 moves in the counterclockwise direction, the outer vibrator 57 moves in the clockwise direction. During the coupled vibration of the inner and outer vibrators 56, 57, each first connection beam 80 bends in a shape as if the first connection beam 80 vibrates with two fixed ends and a vibration node. The two connection ends of the first connection beam 80 with the vibrator 51 operate as the two fixed ends, and a connection point with two corresponding second connection beams 81 operates as the vibration node. Further, each second connection beam 81 bends in a shape as if the second connection beam 81 vibrates with a fixed end and a vibration node. A connection end of the second connection beam 81 with the corresponding first anchor 31 operates as the fixed end, and a connection point with the corresponding first connection beam 80 operates as the vibration node. A vibration node is a point that does not vibrate and has a vibration amplitude of zero during a vibration.

Figure 4:
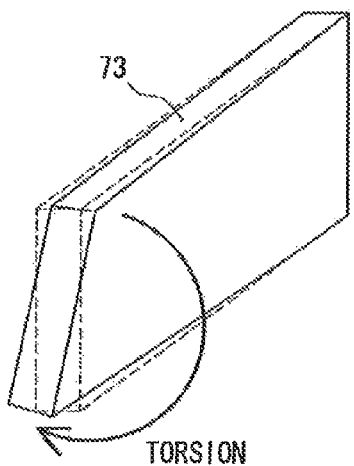
FIG. 4 is a perspective view showing a torsion of a tangent sub-member.
Figure 5:
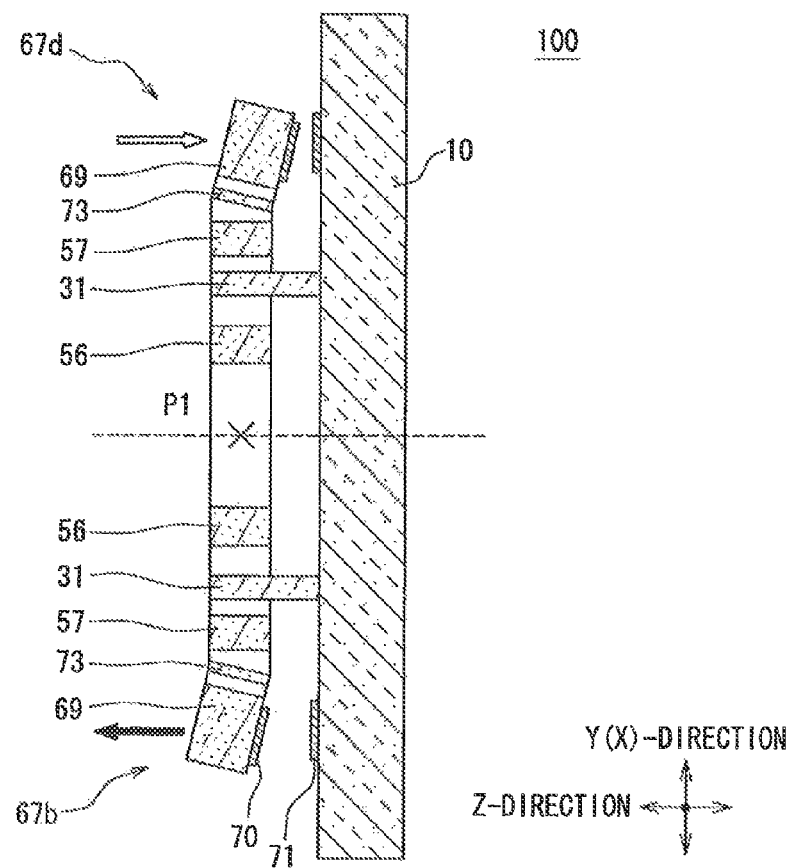
FIG. 5 is a cross-sectional view of the angular velocity sensor showing a displacement of a first detector when a Coriolis force is applied to the angular velocity sensor.

During the coupled vibration of the inner and outer vibrators 56, 57, for example, when an angular velocity is applied to the vibrator 51 in a direction perpendicular to the z-direction, that is parallel to the x-y plane, a Coriolis force is generated and applied to the vibrator 51 along the z-direction. As shown in FIG. 4, when the Coriolis force is applied to the vibrator 51, each tangent sub-member 73 is distorted in the z-direction at a center point, at which the tangent sub-member 73 is coupled to the flexible member 69 via the corresponding second extension sub-member 75. Thus, the vibrator 51 is displaced in the z-direction. Accordingly, a relative distance between each first flexible detection electrode 70 and the corresponding first fixed detection electrode 71 changes, and an electrostatic capacity between each first flexible detection electrode 70 and the corresponding first fixed detection electrode 71 changes. As described above, when the vibrator 51 vibrates in the circumferential direction, two tangential points on the vibrator 51 facing each other move in opposite tangential directions. Thus, the Coriolis force is applied to the two tangential points in opposite directions. For example, as shown in FIG. 5, when an angular velocity is applied to the vibrator 51 in a direction from the first detector 67b to the first detector 67d, the first detector 67b moves to an upper side along the z-direction, and the first detector 67d moves to a lower side along the z-direction. The upper side is defined as a side at which the vibrator 51 is arranged, and the lower side is defined as a side at which the support substrate 10 is arranged. Similarly, when an angular velocity is applied to the vibrator 51 in a direction from the first detector 67a to the first detector 67c, the first detector 67a moves to the upper side along the z-direction, and the first detector 67c moves to the lower side along the z-direction (not shown). Accordingly, each two first detectors (67a and 67c, 67b and 67d) arranged on opposite sides of the vibrator 51 facing each other are displaced in opposite directions due to the Coriolis force. Thus, on the same diametrical direction, when a relative distance between a first flexible detection electrode 70 and a corresponding first fixed detection electrode 71 increases (or decreases), a relative distance between the opposite first flexible detection electrode 70 and a corresponding first fixed detection electrode 71 decreases (or increases). Here, the opposite first flexible detection electrode 70 means another first flexible detection electrode 70 facing the first flexible detection electrode 70 across the vibrator 51. Accordingly on the same diametrical direction, when an electrostatic capacity Ca1 between the first flexible detection electrode 70 and the corresponding first fixed detection electrode 71 decreases (or increases), an electrostatic capacity Ca2 between the opposite first flexible detection electrode 70 and the corresponding first fixed detection electrode 71 increases (or decreases). Thus, the Coriolis force (angular velocity) is detected by calculating a differential between the electrostatic capacity Ca1 and the electrostatic capacity Ca2.

Figure 6:
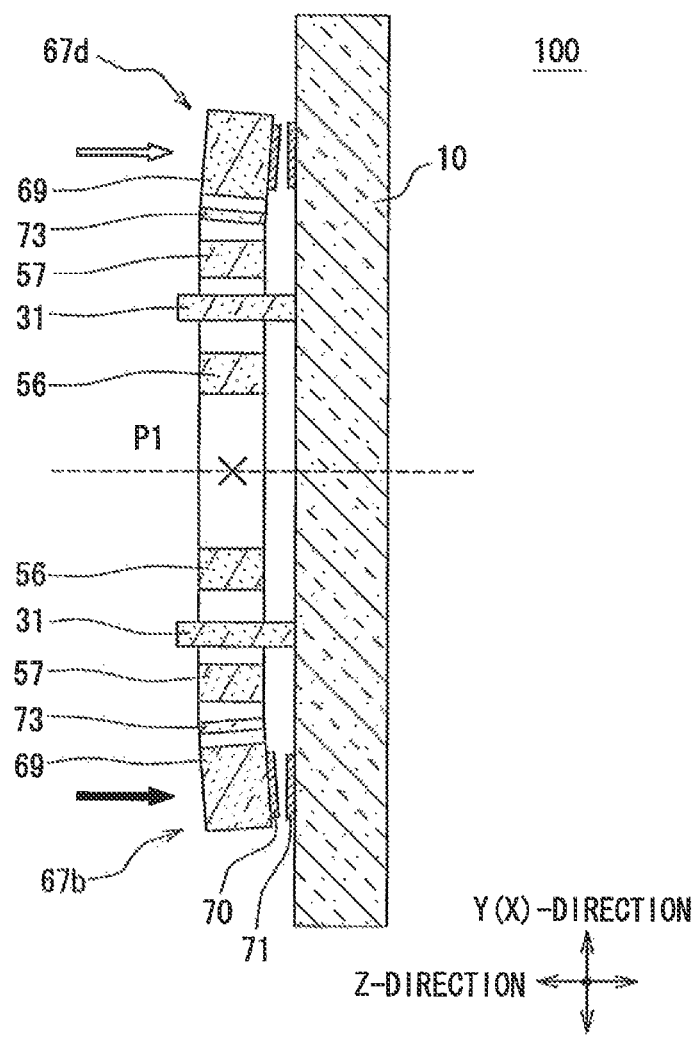
FIG. 6 is a cross-sectional view of the angular velocity sensor showing a displacement of the first detector when an external force is applied to the angular velocity sensor.
Figure 7:
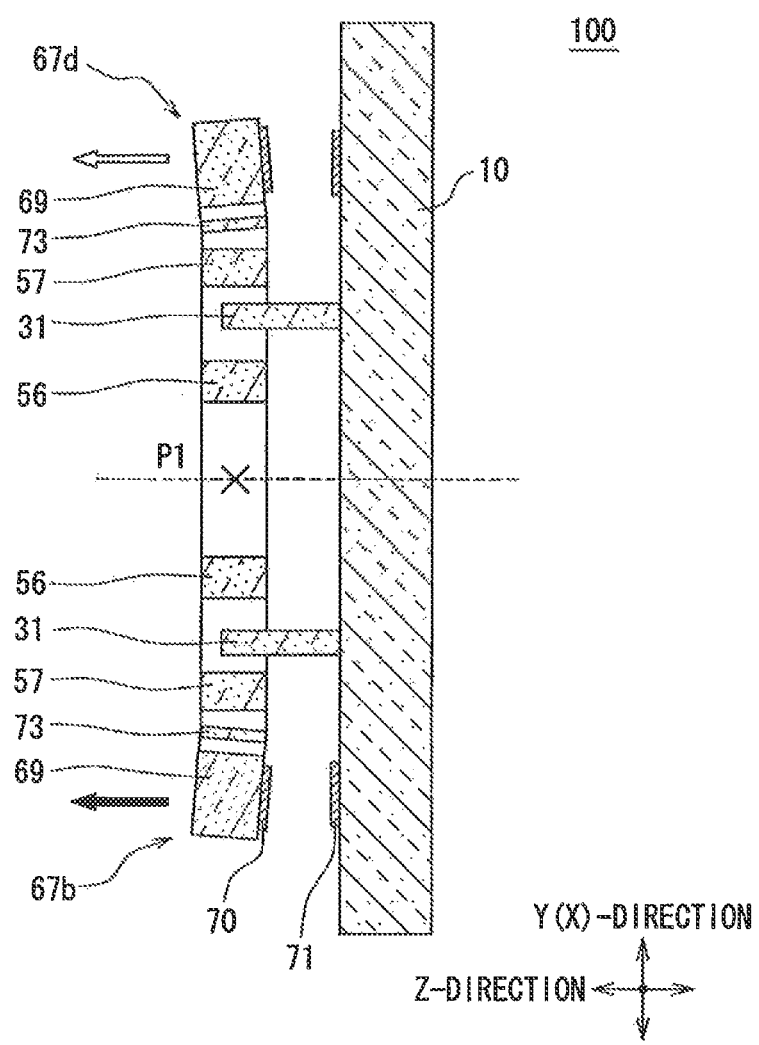
FIG. 7 is a cross-sectional view of the angular velocity sensor showing a displacement of the first detector when an external force is applied to the angular velocity sensor.

During the coupled vibration of the inner and outer vibrators 56, 57, for example, when an external force (acceleration) is applied to the vibrator 51 in a direction parallel to the z-direction, a distance between each first flexible detection electrode 70 and the corresponding first fixed detection electrode 71 is changed. Accordingly, an electrostatic capacity between each first flexible detection electrode 70 and the corresponding first fixed detection electrode 71 is changed. As shown in FIG. 6 and FIG. 7, in this case, since the external force is applied in the direction parallel to the z-direction, a pair of the first detectors 67a, 67c (or 67b, 67d) arranged on opposite sides of the vibrator 51 are displaced in the same direction. Thus, on the same diametrical direction, the relative distance between the first flexible detection electrode 70 and the corresponding first fixed detection electrode 71 and the relative distance between the opposite first flexible detection electrode 70 and the corresponding first fixed detection electrode 71 change in the same manner. Thus, changes in the electrostatic capacity Ca1 and the electrostatic capacity Ca2 due to the external force are compensated when a differential between the electrostatic capacity Ca1 and the electrostatic capacity Ca2 is calculated as described above.

During the coupled vibration of the inner and outer vibrators 56, 57, for example, when an angular velocity is applied to the vibrator 51 in a direction parallel to the z-direction, a Coriolis force is generated and applied to the vibrator 51 in a direction perpendicular to the z-direction. Thus, the vibrator 51 is displaced in a direction parallel to the x-y plane. In this case, the second detectors 68a, 68b arranged on opposite sides of the vibrator 51 are displaced in opposite directions. Thus, the Coriolis force (angular velocity) is detected by calculating a differential between a displacement (or amount of electrostatic capacity change) of the second detector 68a and a displacement (or amount of electrostatic capacity change) of the second detector 68b.

During the coupled vibration of the inner and outer vibrators 56, 57, for example, when an external force (acceleration) is applied to the vibrator 51 in a direction perpendicular to the z-direction, the second detectors 68a, 68b are displaced in the same direction due to the external force. Accordingly, on the same diametrical direction, a relative distance between a second flexible detection electrode 77 and a corresponding second fixed detection electrode 79 and a relative distance between an opposite second flexible detection electrode 77 and a corresponding second fixed detection electrode 79 change in the same manner. Thus, on the same diametrical direction, a change in an electrostatic capacity Cb1 between the second flexible detection electrode 77 and the corresponding second fixed detection electrode 79 and a change in an electrostatic capacity Cb2 between the opposite second flexible detection electrode 77 and the corresponding second fixed detection electrode 79 are compensated when a differential between the electrostatic capacity Cb1 and the electrostatic capacity Cb2 is calculated. That is, when the differential between the electrostatic capacity Cb1 and the electrostatic capacity Cb2 is calculated, the changes in the electrostatic capacities Cb1, Cb2 of the two second detectors 68a, 68b are compensated with each other.

Figure 8:
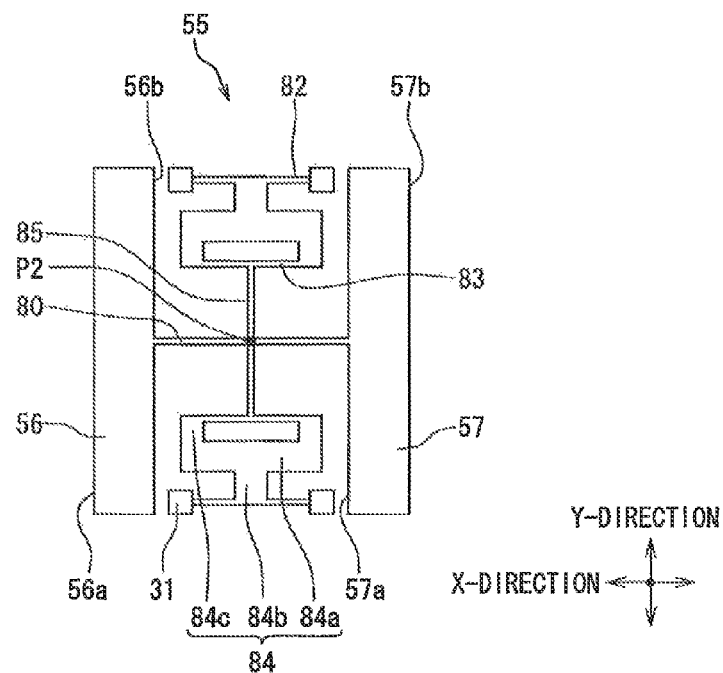
FIG. 8 is a top view of a connection beam.
Figure 9:
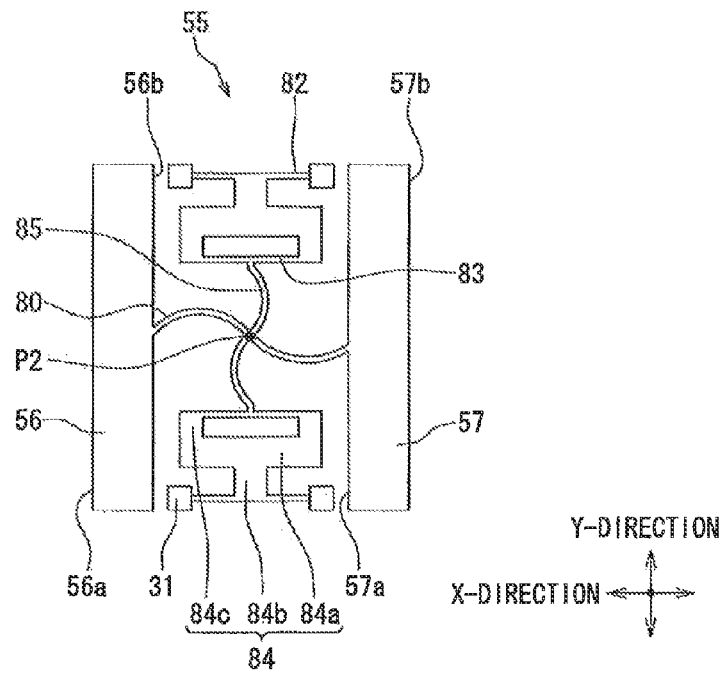
FIG. 9 is a top view showing a vibration state of the connection beam.
Figure 10:
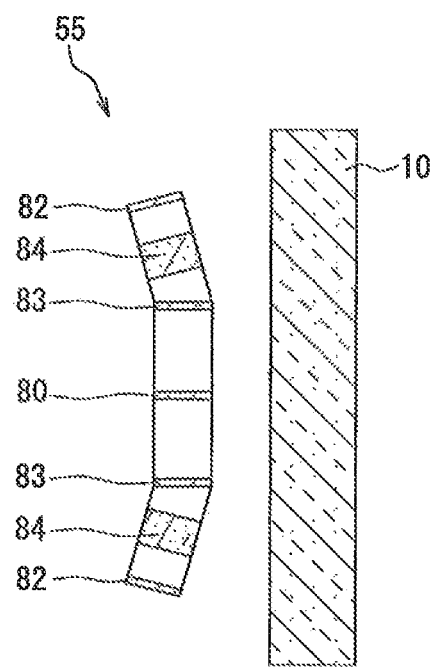
FIG. 10 is a cross-sectional view of the angular velocity sensor showing a displacement of the connection beam when an external force is applied to the angular velocity sensor.
Figure 10:
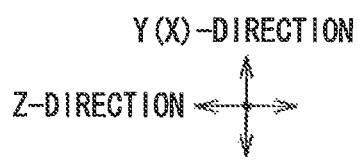

The following will describe about the connection beams 55 with reference to FIG. 8 to FIG. 10. As described above, each connection beam 55 includes a first connection beam 80 and two second connection beams 81. As shown in FIG. 8, each first connection beam 80 has a straight shape. Each first connection beam 80 is coupled to the inner surface 57a of the outer vibrator 57 at one end, and is coupled to the outer surface 56b of the inner vibrator 56 at the other end. Each second connection beam 81 couples the corresponding first connection beam 80 to the corresponding first anchor 31. Further, each first connection beam 80 is coupled with two second connection beams 81 in such a manner that the two second connection beams 81 respectively extend from predetermined side surfaces of the first connection beam 80. The predetermined side surfaces are parallel to the z-direction.

Each second connection beam 81 includes a first sub-beam 82, a second sub-beam 83, a rigid member 84, and a third sub-beam 85. Each of the first sub-beam 82 and the second sub-beam 83 has a rectangular planar shape and is longitudinally parallel to the first connection beam 80. The first sub-beam 82 and the second sub-beam 83 are coupled to the rigid member 84 on opposite sides of the rigid member 84. The rigid member 84 has a greater rigidity than the first sub-beam 82 and the second sub-beam 83. The third sub-beam 85 has a rectangular planar shape, and a longitudinal direction of the third sub-beam 85 is perpendicular to the first connection beam 80. Further, the rigid member 84 includes a plumb sub-member 84a, a first protruded sub-member 84b, and two second protruded sub-members 84c. The plumb sub-member 84a is arranged longitudinally parallel to the first connection beam 80. The first protruded sub-member 84b is protruded from a longitudinal center point of the plumb sub-member 84a in a direction being apart from the first connection beam 80. The two second protruded sub-members 84c are respectively protruded from two longitudinal ends of the plumb sub-member 84a in a direction approaching to the first connection beam 80. The first sub-beam 82 is coupled to two corresponding first anchors 31 at two ends. The second sub-beam 83 is coupled to the two second protruded sub-members 84c at two ends. The third sub-beam 85 is coupled to a center point of the second sub-beam 83 at one end, and is coupled to a corresponding first connection beam 80 at the other end. As shown in FIG. 3, when the inner and outer vibrators 55, 57 vibrate in opposite directions to perform the coupled vibration, each first connection beam 80 and two corresponding second connection beams 81 bend in a shape as if the first connection beam 80 and two corresponding second connection beams 81 vibrate. Each second connection beam 81, specifically one end of the third sub-beam 85, is coupled to a corresponding first connection beam 80 at a point P2 (shown by a solid circle), which operates as a vibration node of the first connection beam 80 during the coupled vibration of the vibrator 51. Thus, each first connection beam 80 and two corresponding second connection beams 81 generally have a cross shape, and a center of the cross shaped first connection beam 80 and two second connection beams 81 is the vibration node P2 of the first connection beam 80. The vibration node P2 of the first connection beam 80 also operates as a vibration node of each second connection beams 81 coupled to the first connection beam 80.

Under above-described configuration, since each first connection beam 80 and the two corresponding second connection beams 81 generally have a cross shape, the first connection beam 80 is able to bend, hereafter also referred to as "bendable". Specifically, the first connection beam 80 is bendable in the circumferential direction with the vibration node P2 as a center point. As shown in FIG. 9, the first connection beam 80 and the two third sub-beams 85 coupled to the first connection beam 80 bend in an "S" shape with the vibration node P2 as the center point. As shown in FIG. 10, when an external force (acceleration) is applied to the inner and outer vibrators 56, 57 in the z-direction, the first sub-beams 82 and the second sub-beams 83 are distorted in the z-direction. Accordingly, the rigid members 84 are displaced in the z-direction, and the first connection beam 80 is displaced in the z-direction.

In the angular velocity sensor 100 according to the present embodiment, four connection beams 55 are arranged between the inner vibrator 56 and the outer vibrator 57 in the circumferential direction at even intervals. Thus, each two connection beams 55, which configure one pair, are arranged facing each other across the inner vibrator 56. As described above, a perpendicular distance between the inner vibrator 56 and the outer vibrator 57 is constant, and the four connection beams 55 have the same shapes. Thus, a distance between the center point P1 and the vibration node P2 of the first connection beam 80 is also constant.

The following will describe about advantages provided by the angular velocity sensor 100 according to the present embodiment. As described above, each second connection beam 81, specifically one end of the third sub-beam 85, is coupled to the corresponding first connection beam 80 at the vibration node P2 of the coupled vibration performed by the inner and outer vibrators 56, 57. Under this configuration, the coupled vibration performed by the inner and outer vibrators 56, 57 is less likely to be transmitted to the support substrate 10 via the connection beams 80, 81. Thus, the vibration is less likely to be transmitted back to the inner and outer vibrators 56, 57 after reflecting on the support substrate 10. Therefore, a vibration state of the vibrator 51 is less likely to become unstable, thereby suppressing a decrease in a sensitivity of angular velocity detection.

The inner vibrator 56 and the outer vibrator 57 are arranged concentrically at the center point P1. Under this configuration, an eccentric movement of the inner and outer vibrators 56, 57 is suppressed compared with a case in which the inner vibrator 56 and the outer vibrator 57 are arranged eccentrically. Thus, a vibration state of the vibrator 51 is less likely to become unstable, thereby suppressing a decrease in the sensitivity of angular velocity detection.

The four connection beams 55 are arranged between the inner vibrator 56 and the outer vibrator 57, and have the same shapes. Under this configuration, a spring constant of each connection beam 55 has a constant value. Thus, a vibration state of the vibrator 51 is less likely to become unstable, thereby suppressing a decrease in the sensitivity of angular velocity detection.

Each first connection beam 80 is coupled with two second connection beams 81. Under this configuration, the vibration node P2 of the first connection beam 80 is supported more strongly by the two second connection beams 81 compared with a case in which each first connection beam 80 is coupled with one second connection beam 81. Thus, a vibration state of the inner vibrator 56 and the outer vibrator 57 is less likely to become unstable, thereby suppressing a decrease in the sensitivity of angular velocity detection.

Each first connection beam 80 has the straight shape perpendicular to the inner surface 57a of the outer vibrator 57 and the outer surface 56b of the inner vibrator 56. Under this configuration, the first connection beam 80 has the same spring constant in the clockwise direction and the counterclockwise direction. Thus, a vibration state of the inner vibrator 56 and the outer vibrator 57 is less likely to become unstable, thereby suppressing a decrease in the sensitivity of angular velocity detection.

Each first flexible driving sub-beam 65 extends from the outer surface 56b of the inner vibrator 56 toward the outer vibrator 57. Each second flexible driving sub-beam 66 extends from the inner surface 57a of the outer vibrator 57 toward the inner vibrator 56. Each first flexible driving sub-electrode extends from a corresponding first flexible driving sub-beam 65, and each second flexible driving sub-electrode extends from a corresponding second flexible driving sub-beam 66. Each flexible driving electrode 63 faces a corresponding fixed driving electrode 64. Under this configuration, an electrostatic force is applied to the inner vibrator 56 and the outer vibrator 57 at the same time. For example, when only the first flexible driving sub-beams 65 are formed, the electrostatic force is only applied to the outer vibrator 57. Further, when only the second flexible driving sub-beams 66 are formed, the electrostatic force is only applied to the inner vibrator 56. Thus, with above-described configuration, a vibration state of the inner vibrator 56 and the outer vibrator 57 is less likely to become unstable, thereby suppressing a decrease in the sensitivity of angular velocity detection.

Each third anchor 33 and two corresponding fixed driving electrodes 64 are arranged between the first flexible driving sub-beam 65 and the second flexible driving sub-beam 66. The two fixed driving electrodes 64 extend from the third anchor 33 toward the first flexible driving sub-beams 65 and the second flexible driving sub-beams 66, respectively. Thus, a configuration of the drivers 53 is simplified compared with a case in which two separate third anchors 33 are arranged for a first flexible driving sub-beam 65 and a second flexible driving sub-beam 66, respectively.

The angular velocity sensor 100 according to the present embodiment includes four first detectors 67a to 67d. Each two of the four first detectors 67a to 67d are arranged facing each other across the vibrator 51. With this configuration, an angular velocity applied perpendicular to the z-direction can be detected. Specifically, as described above, each two first detectors facing each other, for example 67a, 67c or 67b, 67d, move in opposite tangential directions due to the Coriolis force. Thus, on the same diametrical direction, when the relative distance between the first flexible detection electrode 70 and the corresponding first fixed detection electrode 71 increases (or decreases), the relative distance between the opposite first flexible detection electrode 70 and the corresponding first fixed detection electrode 71 decreases (or increases). Accordingly, on the same diametrical direction, when the electrostatic capacity Ca1 between the first flexible detection electrode 70 and the corresponding first fixed detection electrode 71 decreases (or increases), the electrostatic capacity Ca2 between the opposite first flexible detection electrode 70 and the corresponding first fixed detection electrode 71 increases (or decreases). At the same time, when an external force is applied to the vibrator 51, each two first detectors facing each other, for example 67a, 67c or 67b, 67d, move in the same direction. Thus, the electrostatic capacity Ca1 and the electrostatic capacity Ca2 change in the same manner. Therefore, when calculating a differential between the electrostatic capacity Ca1 and the electrostatic capacity Ca2, the change in the electrostatic capacity Ca1 is compensated with the change in the electrostatic capacity Ca2. Thus, the Coriolis force (angular velocity) can be detected by calculating a differential between the change in the electrostatic capacity Ca1 and the change in the electrostatic capacity Ca2. Since the external force does not affect the differential calculation between the electrostatic capacity Ca1 and the electrostatic capacity Ca2 for detecting the Coriolis force (angular velocity), a decrease in the sensitivity of angular velocity detection is suppressed.

As described above, when an angular velocity is applied perpendicular to the z-direction, each two first flexible detection electrodes 70 facing each other across the vibrator 51 are displaced in opposite directions. In a case where the connection member 72, which couples the first flexible detection electrode 70 to the vibrator 51, has a manufacturing error, the displacements of the first flexible detection electrodes 70 have a variation. When the displacements of the two first flexible detection electrodes 70 facing each other have a variation, the change in the electrostatic capacity Ca1 and the change in the electrostatic capacity Ca2 are not compensated sufficiently. Thus, the sensitivity of angular velocity detection may be decreased.

In the angular velocity sensor 100 according to the present embodiment, the connection beam 55 is more likely to be distorted in the z-direction compared with the connection member 72. Thus, each first flexible detection electrode 70 is displaced in the z-direction mainly depending on a torsion of the corresponding connection beam 55 in the z-direction, not depending on a torsion of the corresponding connection member 72. Under this configuration, even when the connection member 72 has a manufacturing error, a variation in displacements of the first flexible detection electrodes 70 is suppressed. Thus, the changes in the electrostatic capacities are compensated sufficiently, thereby suppressing a decrease in the sensitivity of angular velocity detection.

The two second detectors 68a, 68b are arranged facing each other across the vibrator 51. Each second detector 68a, 68b includes a second flexible detection electrode 77 and a second fixed detection electrode 79 engaged with each other and facing each other in the radial direction. With this configuration, an angular velocity in the z-direction can be detected. As described above, in the two second detectors 68a, 68b, two tangential points respectively placed on the two second detectors 68a, 68b move in opposite tangential directions. Thus, when the relative distance between the second flexible detection electrode 77 and the corresponding second fixed detection electrode 79 increases (or decreases), the relative distance between the opposite second flexible detection electrode 77 and the corresponding second fixed detection electrode 79 decreases (or increases). Accordingly, the electrostatic capacity Cb1 between the second flexible detection electrode 77 and the corresponding second fixed detection electrode 79 decreases (or increases), and the electrostatic capacity Cb1 between the opposite second flexible detection electrode 77 and the corresponding second fixed detection electrode 79 increases (or decreases) due to the Coriolis force. When an external force is applied to the vibrator 51, the two second detectors 68a, 68b facing each other move in the same tangential direction. Thus, the electrostatic capacity Cb1 and the electrostatic capacity Cb2 change in the same manner. Therefore, when calculating a differential between the change in the electrostatic capacity Cb1 and the change in the electrostatic capacity Cb2, the change in the electrostatic capacity Cb1 is compensated with the change in the electrostatic capacity Cb2. Thus, the Coriolis force (angular velocity) can be detected by calculating the differential between the change in the electrostatic capacity Cb1 and the change in the electrostatic capacity Cb2. Since the external force does not affect the differential calculation between the change in the electrostatic capacity Cb1 and the change in the electrostatic capacity Cb2 for detecting the Coriolis force (angular velocity), a decrease in the sensitivity of angular velocity detection is suppressed.

The floating section 50 includes the monitors 52, which monitor a vibration state of the vibrator 51. Thus, the vibration state of the vibrator 51 can be monitored by the monitors 52.

In the angular velocity sensor 100 according to the present invention, the floating section 50 includes the detectors 54. Further, each first detector 67 of the detector 54 includes the first fixed detection electrode 71, which is fixed to the support substrate 10. Thus, strictly speaking, the first fixed detection electrode 71 is not included in the detector 54. In the angular velocity sensor 100 according to the present embodiment, it is described that the floating section 50 includes the detectors 54 for convenience.

In the angular velocity sensor 100 according to the present embodiment, the inner and outer vibrators 56, 57 have annular shapes. Alternatively, the inner and outer vibrators 56, 57 may have different shapes other than the annular shape. Further, a distance between the inner vibrator 56 and the outer vibrator 57 may be variable. Under a configuration in which the connection beams 55 have the same shape and the distance between the inner vibrator 56 and the outer vibrator 57 is constant, the vibration state of the inner and outer vibrators 56, 57 in the circumferential direction is more stable compared with a case in which the inner and outer vibrators 56, 57 have different shapes.

In the angular velocity sensor 100 according to the present embodiment, the inner vibrator 56 and the outer vibrator 57 are arranged concentrically. Alternatively, the inner vibrator 56 and the outer vibrator 57 may be arranged eccentrically. Under a configuration in which the inner vibrator 56 and the outer vibrator 57 are arranged concentrically, an eccentric movement of the inner and outer vibrators 56, 57 is suppressed compared with a case in which the inner vibrator 56 and the outer vibrator 57 are arranged eccentrically.

Figure 11:
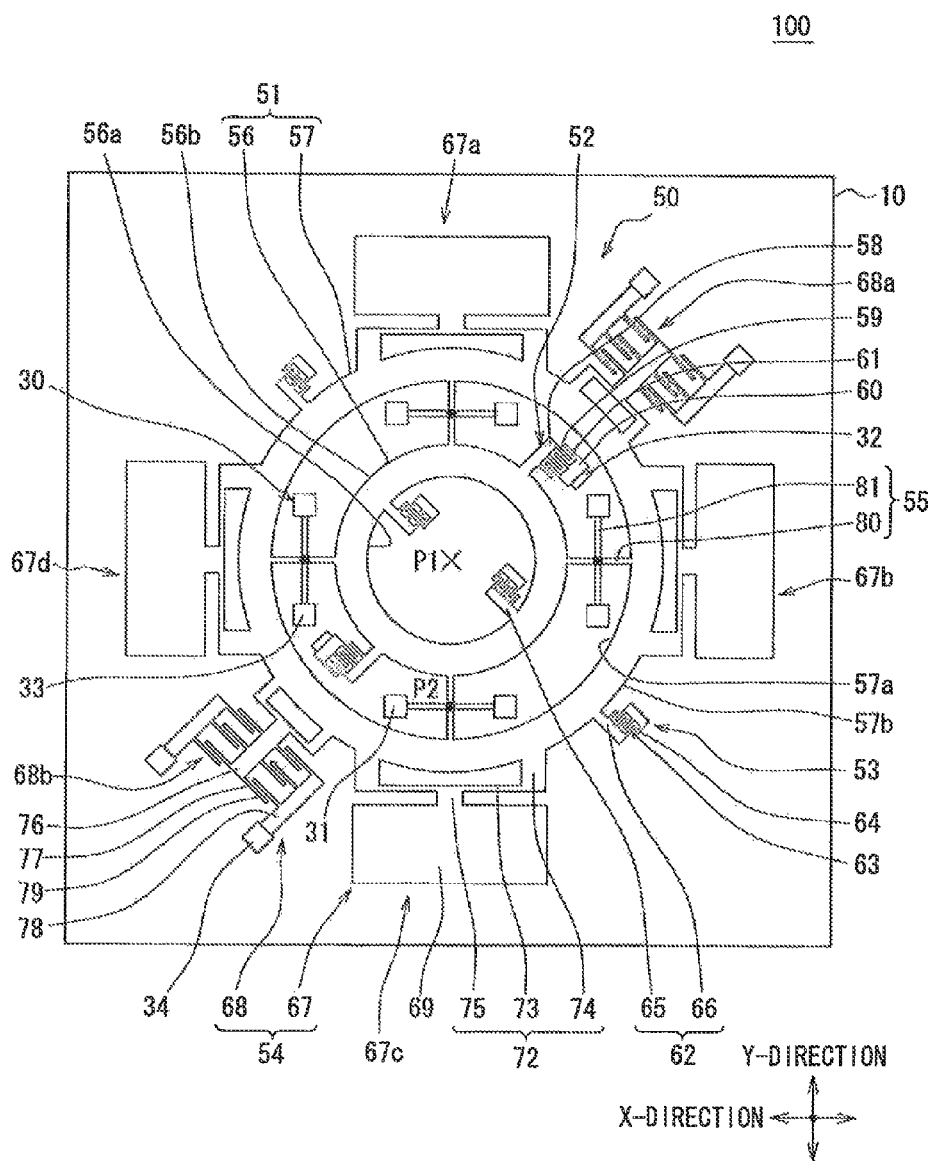
FIG. 11 is a top view of a modification of the angular velocity sensor.

In the angular velocity sensor 100 according to the present embodiment, as shown in FIG. 1, each flexible monitor beam 58 extends from the inner surface 56a of the inner vibrator 56, and the second anchors 32 are arranged in the region surrounded by the inner surface 56a of the inner vibrator 56. Alternatively, as shown in FIG. 11, the flexible monitor beams 58 may extend from the outer surface 56b of the inner vibrator 56, and the second anchors 32 may be arranged in a region surrounded by the outer surface 56b of the inner vibrator 56 and the inner surface 57a of the outer vibrator 57. Alternatively, the flexible monitor beams 58 may extend from the inner surface 57a of the outer vibrator 57, and the second anchors 32 may be arranged in the region surrounded by the outer surface 56b of the inner vibrator 56 and the inner surface 57a of the outer vibrator 57 (not shown). Alternatively, the flexible monitor beams 58 may extend from the outer surface 57b of the outer vibrator 57, and the second anchors 32 may be arranged in an outside region of the outer surface 57b of the outer vibrator 57 (not shown).

In the angular velocity sensor 100 according to the present embodiment, as shown in FIG. 1, each of the first detectors 67a, 67b, 67c, 67d is not arranged in the same direction with any one of the connection beams 55. Alternatively, as shown in FIG. 11, each of the first detectors 67a, 67b, 67c, 67d may be arranged in the same direction with one of the connection beams 55. In FIG. 11, the first detectors 67a, 67c and two connection beams 55 are arranged in the y-direction, and the first detectors 67b, 67d and two connection beams 55 are arranged in the x-direction.

In the angular velocity sensor 100 according to the present embodiment, as shown in FIG. 1, each first flexible driving sub-beam 65 extends from the outer surface 56b of the inner vibrator 56, and each second flexible driving sub-beam 66 extends from the inner surface 57a of the outer vibrator 57. Further, the third anchors 33 are arranged between the outer surface 56b of the inner vibrator 56 and the inner surface 57a of the outer vibrator 57. Alternatively, as shown in FIG. 11, each first flexible driving sub-beam 65 may extend from the inner surface 56a of the inner vibrator 56 toward the center point P1, and each second flexible driving sub-beam 66 may extend from the outer surface 57b of the outer vibrator 57 in the radial direction. The third anchors 33 may be partially arranged in the region surrounded by the inner surface 56a of the inner vibrator 56, and partially arranged in the outside region of the outer surface 57b of the outer vibrator 57. Alternatively, each first flexible driving sub-beam 65 may extend from the inner surface 56a of the inner vibrator 56, and each second flexible driving sub-beam 66 may extend from the inner surface 57a of the outer vibrator 57 (not shown). The third anchors 33 may be partially arranged in the region surrounded by the inner surface 56a of the inner vibrator 56, and partially arranged between the outer surface 56b of the inner vibrator 56 and the inner surface 57a of the outer vibrator 57 (not shown). Alternatively, each first flexible driving sub-beam 65 may extend from the outer surface 56b of the inner vibrator 56, and each second flexible driving sub-beam 66 may extend from the outer surface 57b of the outer vibrator 57 (not shown). The third anchors 33 may be partially arranged between the outer surface 56b of the inner vibrator 56 and the inner surface 57a of the outer vibrator 57, and partially arranged in the outside region of the outer surface 57*b* of the outer vibrator 57 (not shown).

In the angular velocity sensor 100 according to the present embodiment, the first flexible driving sub-beams 65 extend from the inner vibrator 56, and the second flexible driving sub-beams 66 extend from the outer vibrator 57. Alternatively, only first flexible driving sub-beams 65 may extend from the inner vibrator 56 without the second flexible driving sub-beams 66, or only the second flexible driving sub-beams 66 may extend from the outer vibrator 57 without the first flexible driving sub-beams 65. Under a configuration in which both the first flexible driving sub-beams 65 and the second flexible driving sub-beams 66 are arranged, the vibration state of the inner and outer vibrators 56, 57 is more stable compared with a case in which only the first flexible driving sub-beams 65 or the second flexible driving sub-beams 66 are arranged.

In the angular velocity sensor 100 according to the present embodiment, as shown in FIG. 1, the second detector 68*a* and the corresponding connection beam 55 are arranged in the same radial direction, and the second detector 68*b* and the corresponding connection beam 55 are arranged in the same radial direction. Alternatively, the second detector 68*a* or 68*b* may be arranged in a different radial direction with the connection beam 55.

The angular velocity sensor 100 according to the present embodiment includes four first detectors 67*a* to 67*d*. Alternatively, the angular velocity sensor 100 may include one or more first detectors other than four. Under a configuration in which each two first detectors are arranged facing each other across the vibrator 51, an external force, such as an acceleration, is removed effectively during a detection of an angular velocity. Further, when detecting angular velocities perpendicular to each other in the x-y plane, the angular velocities are detected more precisely with above described configuration in which adjacent two first detectors are arranged in the circumferential direction with 90 degree phase difference.

The angular velocity sensor 100 according to the present embodiment includes two second detectors 68*a*, 68*b*. Alternatively, the angular velocity sensor 100 may include one or more second detectors other than two. Under a configuration in which two second detectors 68*a*, 68*b* are arranged facing each other across the vibrator 51, an external force, such as an acceleration, is removed effectively during the detection of the angular velocity. Further, when detecting an angular velocity in the z-direction, the second detectors 68*a*, 68*b* may not be formed in the angular velocity sensor 100.

The angular velocity sensor 100 according to the present embodiment includes four connection beams 55, which couple the vibrator 51 to the first anchors 31, furthermore to the support substrate 10. Alternatively, the angular velocity sensor 100 may include one or more connection beams 55 under a condition that the inner and outer vibrators 56, 57 are movable in opposite directions in order to perform the coupled vibration.

Figure 12:
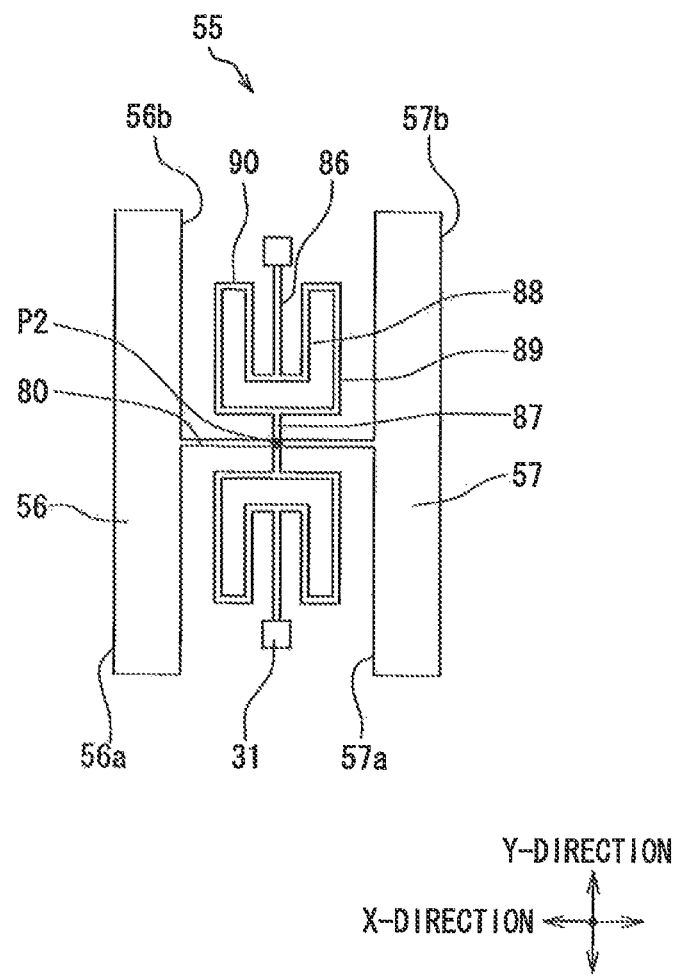
FIG. 12 is a top view of a modification of the connection beam.

In the angular velocity sensor 100 according to the present embodiment, each connection beam 55 has a shape shown in FIG. 8. Alternatively, the connection beam 55 may have another shape, for example, shown in FIG. 12. As shown in FIG. 12, the first connection beam 80 has the same shape with the first connection beam 80 described in the forgoing embodiment, but the second connection beam 81 has a different shape from the second connection beam 81 described in the forgoing embodiment.

As shown in FIG. 12, each second connection beam 81 includes a fourth sub-beam 86, a fifth sub-beam 87, a sixth sub-beam 88, a seventh sub-beam 89, and two eighth sub-beams 90. The fourth and fifth sub-beams 86, 87 have rectangular planar shape and are longitudinally perpendicular to the first connection beam 80. The sixth and seventh sub-beams 88, 89 have U-shapes with straight corners. The two eighth sub-beams 90 have rectangular planar shape, and couples the sixth and seventh sub-beams 88, 89. The fourth sub-beam 86 is coupled to a corresponding first anchor 31 at one end, which is placed apart from the first connection beam 80. The fourth sub-beam 86 is coupled to a center point of the sixth sub-beam 88 at the other end, which is placed near the first connection beam 80. A length of the sixth sub-beam 88 is shorter than a length of the seventh sub-beam 89, and the sixth sub-beam 88 is arranged in a region surrounded by the seventh sub-beam 89. The sixth sub-beam 88 is coupled to one eighth sub-beam 90 at one end, and is coupled to the other eighth sub-beam 90 at the other end. Similarly, the seventh sub-beam 89 is coupled to one eighth sub-beam 90 at one end, and is coupled to the other eighth sub-beam 90 at the other end. The fifth sub-beam 87 is coupled to a center point of the seventh sub-beam 89 at one end, and is coupled to the vibration node P2 of the first connection beam 80. Under this configuration, when an external force, such as an acceleration, is applied to the vibrator 51 in the z-direction, the sub-beams 86, 87, 89 are distorted in the z-direction. Accordingly, the first connection beam 80 is displaced in the z-direction. Since the first connection beam 80 and the two corresponding second connection beams 81 generally have a cross shape, the first connection beam 80 and the two corresponding second connection beams 81 are distorted in the circumferential direction with the vibration node P2 as a center point.

In the angular velocity sensor 100 according to the present embodiment, each first connection beam 80 is coupled with two second connection beams 81 on opposite sides in a cross shape. Alternatively, each first connection beam 80 may be coupled with one second connection beam 81 at only one side in one circumferential direction. Under a configuration in which each first connection beam 80 is coupled with two second connection beams 81, the vibration node P2 of the first connection beam 80 is supported more strongly by the two second connection beams 81 compared with a case in which each first connection beam 80 is coupled with only one second connection beam 81 on one side.

In the angular velocity sensor 100 according to the present embodiment, the connection beams 55 operate as a connection beam section, the drivers 53 operate as a driving section, the monitors 52 operate as a monitor section, the first detectors 67 operate as a detection section, and the second detectors 68 operate as another detection section. In the driving section, the flexible driving electrodes 63 operate as a flexible driving electrode section, and the fixed driving electrodes 64 operate as a fixed driving electrode section. In the monitor section, the flexible monitor electrodes 59 operate as a flexible monitor electrode section, and the fixed monitor electrodes 61 operate as a fixed monitor electrode section.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. An angular velocity sensor comprising:
a vibrator arranged on a x-y plane defined by an x-direction and a y-direction perpendicular to each other;

a support substrate arranged apart from the vibrator in a z-direction perpendicular to the x-y plane;

an anchor section extending from the support substrate to the x-y plane on which the vibrator is arranged;

a connection beam section coupling the vibrator to the anchor section, the connection beam section having an elasticity in the z-direction and an elasticity in an circumferential direction around the z-direction;

a driving section vibrating the vibrator in the circumferential direction; and a plurality of first detectors detecting a displacement of the vibrator in the z-direction, wherein the vibrator includes an outer vibrator having an annular plane shape on the x-y plane and an inner vibrator having an annular plan shape on the x-y plane, and the inner vibrator is arranged in a region surrounded by an inner surface of the outer vibrator;

wherein the connection beam section includes a plurality of first connection beams and a plurality of second connection beams, each of the first connection beams is coupled to the inner surface of the outer vibrator at one end and is coupled to an outer surface of the inner vibrator at the other end, each of the second connection beams is coupled to a corresponding one of the first connection beams at one end and is coupled to the anchor section at the other end, wherein the driving section vibrates the inner vibrator and the outer vibrator in opposite circumferential directions to perform a coupled vibration, and wherein the one end of each of the second connection beams is coupled to the corresponding one of the first connection beams at a vibration node of the coupled vibration performed by the inner vibrator and the outer vibrator.

2. The angular velocity sensor according to claim 1, wherein the inner vibrator and the outer vibrator are arranged concentrically.

3. The angular velocity sensor according to claim 1, wherein a distance between the inner surface of the outer vibrator and the outer surface of the inner vibrator is constant, and wherein the inner vibrator is coupled with the outer vibrator via the first connection beams.

4. The angular velocity sensor according to claim 1, wherein each of the first connection beams has two side surfaces along the z-direction, and wherein two of the second connection beams are respectively coupled to the two side surfaces of the corresponding one of the first connection beams.

5. The angular velocity sensor according to claim 1, wherein each of the first connection beams has a straight shape perpendicular to the inner surface of the outer vibrator and the outer surface of the inner vibrator.

6. The angular velocity sensor according to claim 5, wherein each of the second connection beams includes:
    a first sub-beam having a rectangular planar shape on the x-y plane and longitudinally parallel to the corresponding one of the first connection beams;
    a second sub-beam having a rectangular planar shape on the x-y plane and longitudinally parallel to the corresponding one of the first connection beams;
    a rigid member having a higher rigidity than the first sub-beam and the second sub-beam; and
    a third sub-beam having a rectangular planar shape on the x-y plane and longitudinally perpendicular to the corresponding one of the first connection beams, wherein the rigid member includes a plumb sub-member, a first protruded sub-member, and two second protruded sub-members arranged in such a manner that the plumb sub-member is longitudinally parallel to the corresponding one of the first connection beams, the first protruded sub-member protrudes from a center point of the plumb sub-member in a direction away from the corresponding one of the first connection beams, and the two second protruded sub-members protrude from respective ends of the plumb sub-member in a direction toward the corresponding one of the first connection beams, wherein two ends of the first sub-beams, which correspond to the other end of each of the second connection beams, are coupled to the anchor section, and a center point of the first sub-beam is coupled to the first protruded sub-member, wherein the second sub-beam is coupled to the two second protruded sub-members at two ends, respectively, and wherein one end of the third sub-beam is coupled to a center point of the second sub-beam, and the other end of the third sub-beam, which corresponds to the one end of each of the second connection beams, is coupled to the vibration node of the corresponding one of the first connection beams.

7. The angular velocity sensor according to claim 5, wherein each of the second connection beams includes:
    a fourth sub-beam having a rectangular planar shape on the x-y plane and longitudinally perpendicular to the corresponding one of the first connection beams;
    a fifth sub-beam having a rectangular planar shape on the x-y plane and longitudinally perpendicular to the corresponding one of the first connection beams;
    a sixth sub-beam having a U-shape with straight corners on the x-y plane, the sixth sub-beam having two ends arranged apart from the corresponding one of the first connection beams;
    a seventh sub-beam having a U-shape with straight corners on the x-y plane, the seventh sub-beam having two ends arranged apart from the corresponding one of the first connection beams, the seventh sub-beam having a length greater than a length of the sixth sub-beam such that the sixth sub-beam is arranged in a region surrounded by the seventh sub-beam; and
    two eighth sub-beams having rectangular planar shapes on the x-y plane, one of the two eighth sub-beams coupling one end of the sixth sub-beam to one end of the seventh sub-beam, and the other of the two eight sub-beams coupling the other end of the sixth sub-beam to the other end of the seventh sub-beam, wherein one end of the fourth sub-beam apart from the corresponding one of the first connection beams, which corresponds to the other end of each of the second connection beams, is coupled to the anchor section, wherein the other end of the fourth sub-beam near the corresponding one of the first connection beams, is coupled to a center point of the sixth sub-beam, wherein one end of the fifth sub-beam apart from the corresponding one of the first connection beams is coupled to a center point of the seventh sub-beam, and wherein the other end of the fifth sub-beam near the corresponding one of the first connection beams, which corresponds to the one end of each of the second connection beams, is coupled to the vibration node of the corresponding one of the first connection beams.

8. The angular velocity sensor according to claim 1, wherein the driving section includes a flexible driving electrode section and a fixed driving electrode section, the flexible driving electrode section is coupled to the vibrator, and the fixed driving electrode section is coupled to the support substrate and is arranged facing the flexible driving electrode section in a direction perpendicular to the circumferential direction.

9. The angular velocity sensor according to claim 8, wherein the flexible driving electrode section is coupled to the inner vibrator and the outer vibrator.

10. The angular velocity sensor according to claim 8, wherein the flexible driving electrode section is coupled to only one of the inner vibrator and the outer vibrator.

11. The angular velocity sensor according to claim 1, wherein each of the first detectors includes:
   a first flexible detection electrode arranged on the x-y plane;
   a connection member having an elasticity in the z-direction and coupling the first flexible detection electrode to the vibrator; and
   a first fixed detection electrode attached to the support substrate and facing the first flexible detection electrode in the z-direction.

12. The angular velocity sensor according to claim 11, wherein two of the first detectors include respective first flexible detection electrodes arranged facing each other in the x-direction across the vibrator.

13. The angular velocity sensor according to claim 12, wherein another two of the first detectors include respective first flexible detection electrodes arranged facing each other in the y-direction across the vibrator.

14. The angular velocity sensor according to claim 12, wherein the connection beam section has a smaller elastic modulus in the z-direction than the connection member of each of the first detectors such that the connection beam section is more likely to be distorted in the z-direction than the connection member of each of the first detectors.

15. The angular velocity sensor according to claim 1, further comprising
   a plurality of second detectors detecting a displacement of the vibrator in a direction perpendicular to the z-direction,
   wherein each of the second detectors includes a second flexible detection electrode coupled to the vibrator and a second fixed detection electrode attached to the support substrate, and the second flexible detection electrode faces the second fixed detection electrode in the direction perpendicular to the circumferential direction.

16. The angular velocity sensor according to claim 1, further comprising
   a monitor section that monitors a vibration state of the vibrator,
   wherein the monitor section includes a flexible monitor electrode section coupled to the vibrator and a fixed monitor electrode section attached to the support substrate, the flexible monitor electrode section faces the fixed monitor electrode section in the direction perpendicular to the circumferential direction.

* * * * *